3,712,982
BENZOXAZOLYLSTILBAZOLE FLUORESCENT
WHITENING AGENT
Alfred C. Meunier and Nathan N. Crounse, Cincinnati,
Ohio, assignors to Sterling Drug Inc., New York, N.Y.
No Drawing. Continuation-in-part of abandoned application Ser. No. 855,729, Sept. 5, 1969. This application Sept. 13, 1971, Ser. No. 180,166
Int. Cl. C09b 23/14
U.S. Cl. 260—240 D                     1 Claim

ABSTRACT OF THE DISCLOSURE

The fluorescent compound 5,4'-bis(benzoxazol-2-yl)-2-stilbazole, which is useful as an optical brightening agent for fibrous and fiber-forming organic materials.

---

This application is a continuation-in-part of our co-pending application, Ser. No. 855,729, filed Sept. 5, 1969, now abandoned.

This invention relates to chemical compositions of matter classified as benzoxazolylstilbazoles.

The novel chemical compound of our invention is 5,4'-bis(benzoxazol-2-yl)-2-stilbazole, having the structural formula

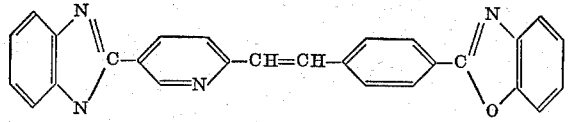

We have discovered that this compound has highly valuable properties as a fluorescent whitening and brightening agent and is useful for the optical bleaching and brightening of many natural and synthetic fibrous and fiber-forming organic materials, including those of cotton, viscose, acetate rayon, silk, polyhexamethylene-adipic acid amide, poly(cyclohexylenedimethylene terephthalate), polyacrylonitrile, polyethylene terephthalate, and polyurethane.

In one method, the new compound of our invention is readily and conveniently obtained by heating 5,4'-(2-stilbazole)dicarboxylic acid, i.e., 6-(4-carboxystyryl)-nicotinic acid with two molecular equivalents of ortho-aminophenol in the presence of polyphosphoric acid or equivalent acidic cyclizing medium. The 5,4'-bis(benzoxazol-2-yl)-2-stilbazole thus produced, which separates from the reaction mixture as a yellow solid, is collected in suitable fashion, as by filtration. In a second method for preparing 5,4'-bis(benzoxazol-2-yl)-2-stilbazole, 5,4'-(2-stilbazole)-dicarbonyl chloride and two equivalents of ortho-aminophenol are interacted in trichlorobenzene at about 130° C. to about 215° C. The product is separated from the cooled solvent by filtration.

Our new compound can be applied to natural and synthetic fibrous and fiber-forming organic materials by conventional procedures. For example, in application to textile, fabrics and paper, an aqueous dispersion of the compound can be used. Thus, a dispersion of the compound for this purpose is obtained by dissolving the compound in a suitable solvent, for instance N,N-dimethylformamide, the resulting solution is mixed with water, or with water containing a surface active agent, and the dispersion obtained in this manner is used as a dye or padding bath. Dyeings and padding may be carried out with or without the aid of carriers, for example, trichlorobenzene, methyl salicylate, o-phenylphenol, and the like. Enhancement of the brightness can then be obtained by conventional curing procedures, for example, heat treatments, particularly when applied to polyester fibers.

5,4'-bis(benzoxazol-2-yl) - 2 - stilbazole has excellent stability even at elevated temperatures, for instance 250–325° C., and this property makes the compound especially advantageous for addition to casting or spinning melts of polyolefins and polyesters, particularly of polyethylene, polyethylene terephthalate and poly(cyclohexylenedimethylene terephthalate). Moreover, the compound has excellent stability to light, and in particular, ultraviolet light.

Our invention is illustrated by the following examples without, however, being limited thereto.

EXAMPLE 1

5,4'-(2-stilbazole)dicarboxylic acid

A solution containing 6.85 parts by weight of 6-methylnicotinic acid and 7.50 parts of terephthaldehydic acid in 50 parts of acetic anhydride was refluxed for 12 hours. The solution was then cooled and 150 parts of 10% sodium carbonate solution was added to render the final solution pH 4.5. The solvent was removed by distillation until the residue was nearly dry, and the residue was triturated with 24 parts of 10% sodium carbonate solution and 500 parts of water. The pH of the solution was then adjusted to pH 10 with 35 parts of 10% sodium hydroxide solution and the resulting solution was treated with activated charcoal, filtered, and acidified with hydrochloric acid. The 5,4'-(2-stilbazole)dicarboxylic acid, which crystallized on cooling, had a gram extinction coefficient of 142.5 at 329 nm. (max.) (.002 N NaOH) and was 99% pure by alkalimetric titration.

5,4'-bis(benzoxazol-2-yl)-2-stilbazole

To 75 parts by weight of polyphosphoric acid was added 5.29 parts of 5,4'-(2-stilbazole)dicarboxylic acid prepared as above and 4.36 parts of ortho-aminophenol. The mixture was heated at 160–168° C. for 6½ hours with constant stirring. The mixture was then poured into excess water and the resulting mixture was heated at 80–85° C. for ½ hour. The resulting crude 5,4'-bis(benzoxazol-2-yl)-2-stilbazole was collected on a filter and washed with water. The product was purified by heating it with dilute sodium hydroxide solution to remove acid impurities and was recrystallized from trichlorobenzene. Further purification was accomplished by vacuum sublimation. Pure 5,4'-bis(benzoxazol-2-yl)-2-stilbazole thus prepared remained unmelted at 300° C. The gram extinction coefficient of this compound dissolved in DMF was 183 at 376 nm. The compound was highly fluorescent, and the wavelength of maximum emission was 440 (in DMF) and the wavelength of maximum excitation was 383 (in DMF).

The structural formula assigned to the product of the instant invention is in full conformance with the modes of synthesis employed in obtaining it and with the results of elementary and spectral analyses of the product.

The 5,4'-bis(benzoxazol-2-yl)-2-stilbazole obtained by the above processes was found to be a highly effective whitening and brightening agent when applied in relatively small amount, for instance 0.001 to 0.1 percent by weight, to a variety of natural and synthetic fibrous and fiber forming organic materials. Thus, for example, 1.67 g. of 5,4'-bis(benzoxazol-2-yl)-2-stilbazole was dissolved in 100 ml. of N,N-dimethylformamide, and 3 ml. of the resulting solution was added to 100 ml. of a 0.4 percent aqueous solution of sodium lauryl sulfate to produce a dye bath. White sample cloths of different fiber types were immersed in this bath and then rinsed with water and examined visually under daylight and under ultraviolet light. It was found that cloths of cotton, cellulose acetate, viscose, silk, polyacrylonitrile fiber (Orlon), polyhexamethyleneadipic acid amide fiber (nylon), and polyethylene terephthalate fiber (Dacron and Fortrel) were beneficially whitened and brightened by this procedure, which imparted a blue-white fluorescence to the fabrics. There was little or no effect on wool cloth.

Spinning melts of polyethylene terephthalate (Dacron and Fortrel) were beneficially whitened and brightened when a small proportion (for instance, 0.01 to 0.1 percent by weight) of 5,4'-bis(benzoxazol-2-yl)-2-stilbazole was added directly to and dissolved in the melt. For example, 5,4'-bis(benzoxazol-2-yl)-2-stilbazole was incorporated at a level of 0.02 percent by weight of brightener in a polyethylene terephthalate-dimethyl terephthalate mixture containing 95 percent polyethylene terephthalate by weight, by dissolving the brightener in the dimethyl terephthalate and incorporating the resulting solution into the plastic mixture melt. The casting obtained on cooling was ground with a mortar and pestle and further pulverized in a ball mill containing a small quantity of water. The dry powdered plastic was then screened through a 40 mesh screen, that material failing to pass through the screen being rejected. The resulting plastic powder containing brightener was compared for shade of whiteness with a blank polyethylene terephthalate-dimethyl terephthalate plastic mixture containing no brightener. It was found that the plastic was beneficially whitened and brightened by the incorporation of the claimed compound, 5,4'-bis(benzoxazol-2-yl)-2-stilbazole, which imparted a blue-white fluorescence to the plastic. The readings were made on a Hunterlab Model D-25 Color and Color-Difference Meter (Hunter Associates Laboratory, Inc., Fairfax, Va.). The values obtained are shown in the following table:

TABLE I.—HUNTERLAB D-25 READINGS

| Sample | Hunter values | | |
|---|---|---|---|
| | L | a | b |
| Plastic containing no brightener | 98.6 | +0.4 | +0.9 |
| Plastic containing the brightener described herein | 98.5 | +1.6 | −3.4 |

In accordance with a variant of the test method described above, the effectiveness of 5,4'-bis(benzoxazol-2-yl)-2-stilbazole as an optical brightening agent as prepared above, when incorporated into a polyethylene terephthalate-dimethyl terephthalate mixture containing 90 percent polyethylene terephthalate was tested as follows:

A solution of 5,4'-bis(benzoxazol-2-yl)-2-stilbazole (Example 1) in dimethyl terephthalate was prepared by intermixing 0.04 g. of the brightener with 10.00 g. of dimethyl terephthalate and melting the two solids together, with continual stirring and under a carbon dioxide atmosphere, by immersing the container holding the mixture in a bath of diethyl phthalate which was then heated to 200° C. during a period of about 15–20 minutes. The fluid mixture was poured into a mortar and ground to a fine powder. The solid solution of brightener in dimethyl terephthalate was incorporated into polyethylene terephthalate by blending 1.5 g. of the brightener-dimethyl terephthalate powder with 18.0 g. of predried polyethylene terephthalate chips and 0.5 g. of dimethyl terephthalate. The mixture was melted under a carbon dioxide atmosphere by immersing the container in a bath of diethyl phthalate at 115° C. after which the bath was heated to boiling (295–7° C.). The melt was stirred for five minutes, and it then was removed from the bath and allowed to cool to room temperature, continually under carbon dioxide. The polyethylene terephthalate casting was then broken up and ball milled with stone ware pellets in distilled water. The particles were dried and screened, and those passing through a 40 mesh screen were packed into a 5 cm. polystyrene Petri dish. The color of the sample, which contained 0.03 percent of the brightener by weight, was then measured on a color difference meter (Hunterlab Model D-25, Hunter Associates Laboratory, McLean, Va.) in comparison with a standard magnesium oxide plate. These values were then compared with a blank sample prepared in the identical way except that the optical brightener was omitted.

By following the procedure described immediately above, additional samples of polyethylene terephthalate containing concentrations of 0.01 percent and 0.02 percent respectively of 5,4'-bis(benzoxazol-2-yl)-2-stilbazole were prepared and the color of the samples measured on a color difference meter as mentioned above. The values obtained are shown in the following table:

TABLE II.—HUNTERLAB D-25 READINGS

| Sample | Hunter values | | |
|---|---|---|---|
| | L | a | b |
| Plastic containing no brightener | 97.6 | +0.2 | +2.1 |
| Plastic plus 0.03 percent of the brightener described herein | 97.5 | +1.9 | −1.2 |
| Plastic plus 0.02 percent of the brightener described herein | 97.8 | +1.7 | −1.3 |
| Plastic plus 0.01 percent of the brightener described herein | 97.7 | +1.5 | −0.5 |

The results recorded in Tables I and II show that the shade of whiteness imparted to polyethylene terephthalate by the claimed brightener was in the pink and blue range considered most desirable in the textile art. For the significance of the "Hunter Values" recorded in Tables I and II above, see R. S. Hunter, Photoelectric Color Difference Meter, J. Opt. Soc. Am., 48, 985 (1958).

We claim:
1. The fluorescent compound 5,4'-bis(benzoxazol-2-yl)-2-stilbazole.

References Cited

UNITED STATES PATENTS

| 3,366,575 | 1/1968 | Ono et al. | 252—301.2 W |
| 3,412,089 | 11/1968 | Ohkama et al. | 260—240 C A |

FOREIGN PATENTS

| 15,150 | 7/1969 | Japan | 260—240 D |

OTHER REFERENCES

German Offenlegungsschrift No. 1,965,654, 57 pages published July 30, 1970, pp. 17, 27, 29–30 and 54 noted.

JOHN D. RANDOLPH, Primary Examiner

U.S. Cl. X.R.

106—164, 176; 117—33.5 T; 252—301.2 W; 260—37 NP, 75 R, 785, 88, 7 B

UNITED STATES PATENT AND TRADEMARK OFFICE
CERTIFICATE OF CORRECTION

PATENT NO. : 3,712,982
DATED : January 23, 1973
INVENTOR(S) : Alfred C. Meunier and Nathan N. Crounse It is certified that error appears in the above-identified patent and that said Letters Patent are hereby corrected as shown below:

Column 1, line 30

"
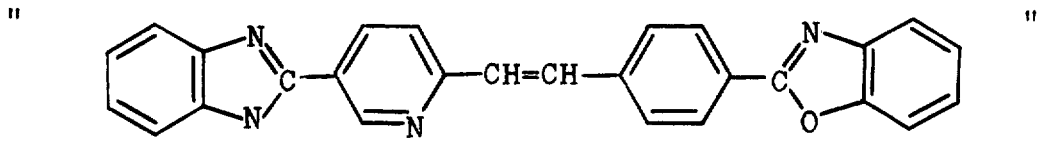
"

should read

-- 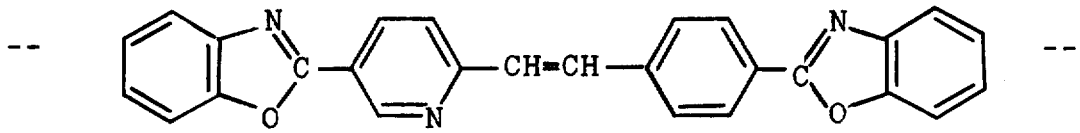 --

Signed and Sealed this

Seventeenth Day of May 1977

[SEAL]

Attest:

RUTH C. MASON
Attesting Officer

C. MARSHALL DANN
Commissioner of Patents and Trademarks